(12) United States Patent
Johar

(10) Patent No.: US 10,341,630 B2
(45) Date of Patent: *Jul. 2, 2019

(54) CREATING TIME LAPSE VIDEO IN REAL-TIME

(71) Applicant: Amanjyot Singh Johar, Fremont, CA (US)

(72) Inventor: Amanjyot Singh Johar, Fremont, CA (US)

(73) Assignee: IDL CONCEPTS, LLC, Los Altos, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/470,860

(22) Filed: Mar. 27, 2017

(65) Prior Publication Data

US 2017/0339388 A1    Nov. 23, 2017

Related U.S. Application Data

(63) Continuation of application No. 15/069,964, filed on Mar. 15, 2016, now Pat. No. 9,609,299, which is a continuation of application No. 13/843,977, filed on Mar. 15, 2013, now Pat. No. 9,414,038.

(60) Provisional application No. 61/795,400, filed on Oct. 16, 2012.

(51) Int. Cl.
| | |
|---|---|
| *H04N 9/79* | (2006.01) |
| *H04N 5/915* | (2006.01) |
| *H04N 5/77* | (2006.01) |
| *H04N 5/91* | (2006.01) |
| *H04N 5/76* | (2006.01) |

(52) U.S. Cl.
CPC ............... *H04N 9/79* (2013.01); *H04N 5/77* (2013.01); *H04N 5/91* (2013.01); *H04N 5/915* (2013.01); *H04N 5/76* (2013.01)

(58) Field of Classification Search
CPC .. H04N 9/79; H04N 5/77; H04N 5/91; H04N 5/915; H04N 5/76
See application file for complete search history.

(56) References Cited

U.S. PATENT DOCUMENTS

| | | |
|---|---|---|
| 6,571,050 B1 | 5/2003 | Park |
| 6,760,536 B1 | 7/2004 | Amir |
| 6,782,187 B1 | 8/2004 | Jeon |
| 7,203,620 B2 | 4/2007 | Li |
| 7,694,320 B1 | 4/2010 | Yeo |
| 8,020,183 B2 | 9/2011 | Ferman |
| 2002/0039481 A1 | 4/2002 | Jun |
| 2002/0051010 A1 | 5/2002 | Jun |
| 2005/0271357 A1 | 12/2005 | Adler et al. |
| 2005/0275716 A1 | 12/2005 | Shingu |
| 2006/0236245 A1 | 10/2006 | Agarwal |
| 2008/0232766 A1 | 9/2008 | Van Quickelberge |
| 2010/0104261 A1 | 4/2010 | Liu |
| 2011/0217019 A1 | 9/2011 | Kamezawa |
| 2013/0129317 A1 | 5/2013 | Moorer |
| 2013/0235234 A1 | 9/2013 | Cucci et al. |

*Primary Examiner* — Mishawn N. Hunter
(74) *Attorney, Agent, or Firm* — Law Office of Dorian Cartwright; Dorian Cartwright

(57) ABSTRACT

A time lapse video is created in real-time, without post-production. User configurations are set for a time lapse video recording. A real-time video feed is received into a buffer. Based on a user configuration for frequency, certain frames in the buffer can be discarded prior to generating the video file. The time lapse video is output as a video file according to user configurations.

13 Claims, 5 Drawing Sheets

CREATING TIME LAPSE VIDEO IN REAL-TIME

CROSS-REFERENCES TO RELATED APPLICATIONS

This application claims priority as a continuation of U.S. patent application Ser. No. 15/069,964, entitled CREATING TIME LAPSE VIDEO IN REAL-TIME, by Amanjyot Johar, filed Mar. 15, 2016, now issued U.S. Pat. No. 9,609,299, which claims priority as a continuation of U.S. patent application Ser. No. 13/843,977, entitled CREATING TIME LAPSE VIDEO IN REAL-TIME, by Amanjyot Johar, filed Mar. 15, 2013, now issued U.S. Pat. No. 9,414,038, which claims priority under 35 USC 120 to U.S. Pat. App. No. 61/795,400, entitled METHOD AND APPARATUS FOR CREATING A TIME LAPSE VIDEO, by Amanjyot Johar, filed Oct. 16, 2012, the contents of which are being hereby incorporated by reference in its entirety.

FIELD OF THE INVENTION

The invention relates generally to digital video, and more specifically, to creating time lapse digital video in real-time.

BACKGROUND OF THE INVENTION

Currently, video processing techniques are applied to raw footage that already exists. For example, an MPG video file is generated on a cell phone and is later edited on a desktop computer with a video editing software application. At that point in post-production, various techniques are applied to the video content and rendered as a new file. Some examples include processing the video in slow motion, adding footage from different tracks, changing the frame rate of playback to speed up or slow down the video etc.

Problematically, for both still photography and video the raw footage for creating time lapse videos consumes a lot of storage as raw footage is taken for hours or even weeks at a time. The problem is exasperated on devices that are limited in storage, such as a mobile device. Ironically, the same mobile devices have embedded still and video cameras with increasing resolutions including high-definition resolution and 3-dimensinal capabilities. The resulting file size limits the duration of video that can be captured. After editing, the output file can be reduced to, for example, 1% or less of the raw footage file.

Moreover, the video editing software applications can be complex for users that just intend to capture video. Formatting between the capture device and the editing device has to be compatible. Furthermore, the additional cost is sometimes prohibitive.

What is needed is a technique for creating time-lapse video from still raw images or raw video footage in real-time, while overcoming the deficiencies of the prior art.

SUMMARY

To meet the above-described needs, methods, computer program products, and systems for creating time lapse video in real-time.

In one embodiment, user configurations are set for a time lapse video recording. A real-time video feed is received into a buffer of a device. Based on a user configuration for the length of footage desired, the number or frequency of shots and/or frame rates, the device adapts itself to capture a video stream according to the specified parameters. To create the final time lapse video, certain frames in the buffer can be discarded prior to generating the video file. The time lapse video is output as a video file according to user configurations. No post production in a video editing software application is necessary.

In another embodiment, a real time feed from still camera images is received into a buffer. Based on user configuration for the length of footage desired, the number or frequency of shots and/or the frame rates, the device can create a video stream from the raw still images. Since the frame rate of the still images will be substantially higher than the frame rate of a point and shoot or high end DSLRS available in the market today, the resulting video is free from the effects of jitters associated with such video production.

In another embodiment, the frequency adjusts the shutter speed of a video source. The resulting real-time video feed is received at the time lapse rate in this case.

In yet another embodiment, the frequency or frame rate or even the length of footage desired can be varied while a time lapse video is already being recorded. For example, the time lapse can be slowed down at certain points, and sped up at other points.

Advantageously, time lapse videos are generated on-the-fly to save storage space and post-production complexity.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for creating real-time time lapse video. Generally, a time lapse video has a duration that is shorter than a duration of video capture. For example, a time lapse video of a 1-hour sunset can be condensed into a 1 minute video output file. Other video content an include surveillance video, blooming flowers, traffic patterns, or any other subject matter. Frames in the video output file can be played back at a faster rate than capture in order to shorten the duration.

Figure 1:
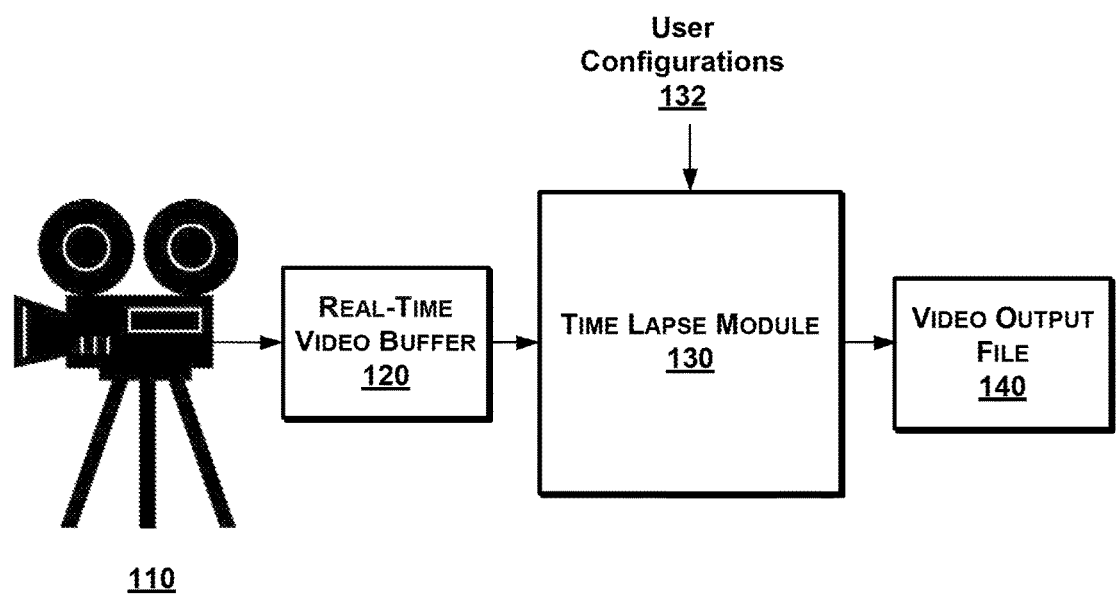
FIG. 1 is a high-level block diagram illustrating a system to create time lapse video in real-time, according to one embodiment.
Figure 2:
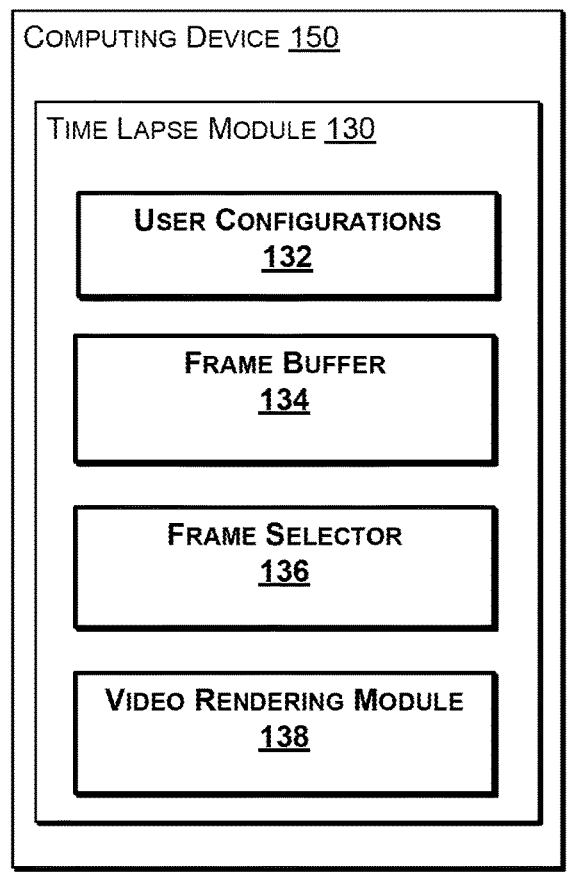
FIG. 2 is a more detailed block diagram illustrating a time lapse module of FIG. 1, according to one embodiment.

Time Lapse Video Systems (FIGS. 1-2)

FIG. 1 is a high-level block diagram illustrating a system 100 to create time lapse video in real-time, according to one embodiment. The system 100 comprises a photographic or video source 110, real time image or video buffer 120, a time lapse module 130, and a video output file. The data flow starts at the video source 110 which stores video data in the real-time video buffer 120 until the video data is processed by the time lapse module 130 into a video output file 140.

The video source 110 can be any device capable of capturing real time video or still images of a subject. In other embodiments, the video source 110 can be a rendering engine that outputs frames. In some embodiments, the video source 110 can be integrated to a single device that generates time lapse videos. In other embodiments, the video source 110 can be wired, plugged-in, or remotely connected to the other components of the system 100.

The real-time image or video buffer 120 can be a RAM memory or any other type of storage element. The real-time video buffer 120 receives video data from the video source. Video frames are generally received at a rate of 24, 25 or 30 frames per second, or any other appropriate rate. The rate may optionally be programmable by the user. The frames can be interlaced or progressive, standard or high definition resolution, and 2-dimensional or 3-dimensional. The frames can be stored temporarily until ready for processing. The frames can be raw, uncompressed video frames, or compressed video. Video and images may occupy more memory than the available RAM memory. Persons skilled in the art may recognize that in such cases the images and videos may temporarily be stored in the main memory until ready for processing.

The time lapse module 130 applies user configurations to the real-time video. In one embodiment, the frequency parameter is applied to frames captured into the real-time video buffer 120. For example, if the time lapse is 2× normal video speed, every other frame can be selected for the video output file 140. In another embodiment, the frequency parameter is applied to the video source 110 by adjusting the shutter speed. Consequentially, frames are generated at the time lapse video speed. In yet another embodiment, a user may be able to specify the frame rate desired or the length of the footage desired. Additional embodiments of the time lapse module 130 are described below with respect to FIG. 2.

The video output file 140 includes a time lapse video resulting from the video processing. The video output file 140 can be of any format, compressed or uncompressed, lossy or lossless. Exemplary formats include MPG, AVI, WMV, MOV, MP4, or any other suitable format.

FIG. 2 is a more detailed block diagram illustrating a time lapse module 130 of FIG. 1, according to one embodiment. The time lapse module can be implemented in a computing device 150, such as a cell telephone, a tablet computing device, a digital handheld camera, a time lapse video device, or any other suitable computing device as described below in association with FIG. 5. The time lapse module 130 further comprises user configurations 132, a frame selector 134, and a video compression module 136.

The user configurations 132 can be a set of parameters for the time lapse video stored in a memory location. The particular user configurations are specific to an implementation. Exemplary user configurations 131 include a frequency of time lapse video relative to real-time video, a duration of output video, a duration of input video, the desired frame rate while shooting the video, the desired frame rate for video playback and the like. The frequency parameter can be applied to a shutter on the camera, or to buffered frames, as describe below. In one embodiment, the user configurations 131 can be received through a user interface such as a touch screen or pointer. In another embodiment, the user configurations 131 can be set by physical buttons, switches, or dials.

The frame selector 134 determines which frames to use and which to discard from the real-time video feed, based on the set of parameters corresponding to the user configurations described above.

The frame buffer 136 can be a cache or other fast memory element to store frames being processed. Several frames are stored when implementing temporal compression algorithms such as MPG.

The video rendering module 138 renders the video output file 140 according to pre-configured settings. The settings can include a type of format, a resolution, and other settings. Video rendering can also include compression of the video to reduce the size of the video output file 140. Some embodiments include hardware accelerators for rendering tasks.

Figure 3:
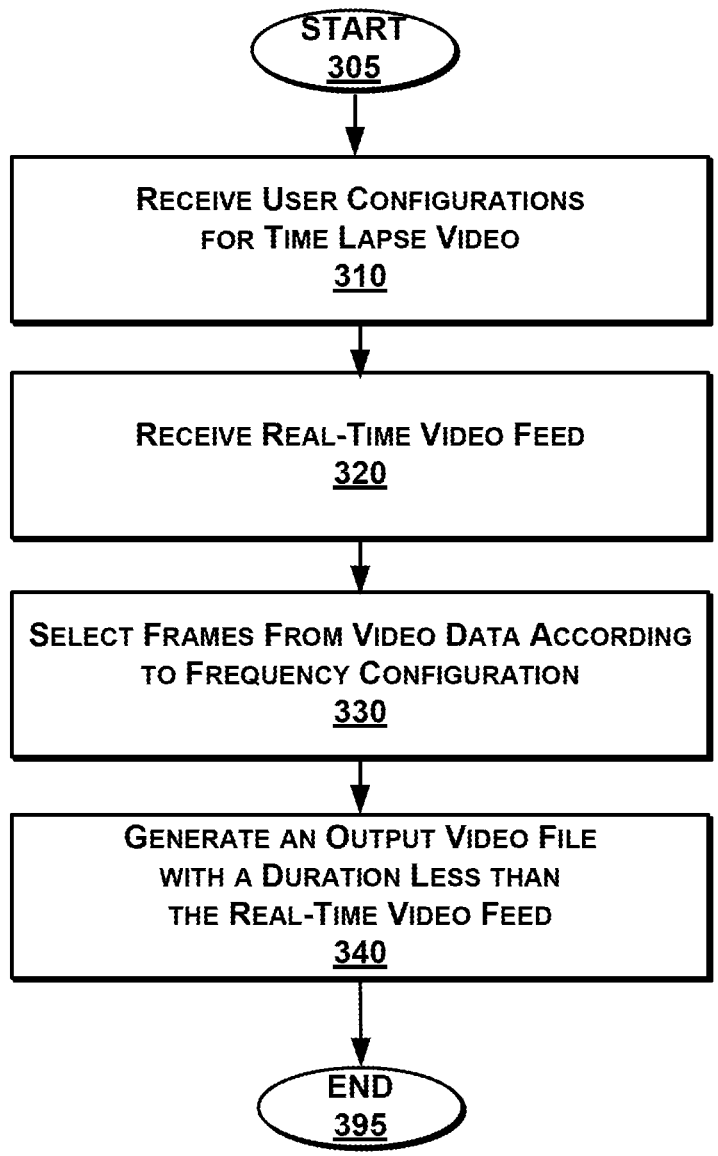
FIG. 3 is a high-level flow diagram illustrating a method for creating time lapse video in real-time, according to one embodiment.
Figure 4:
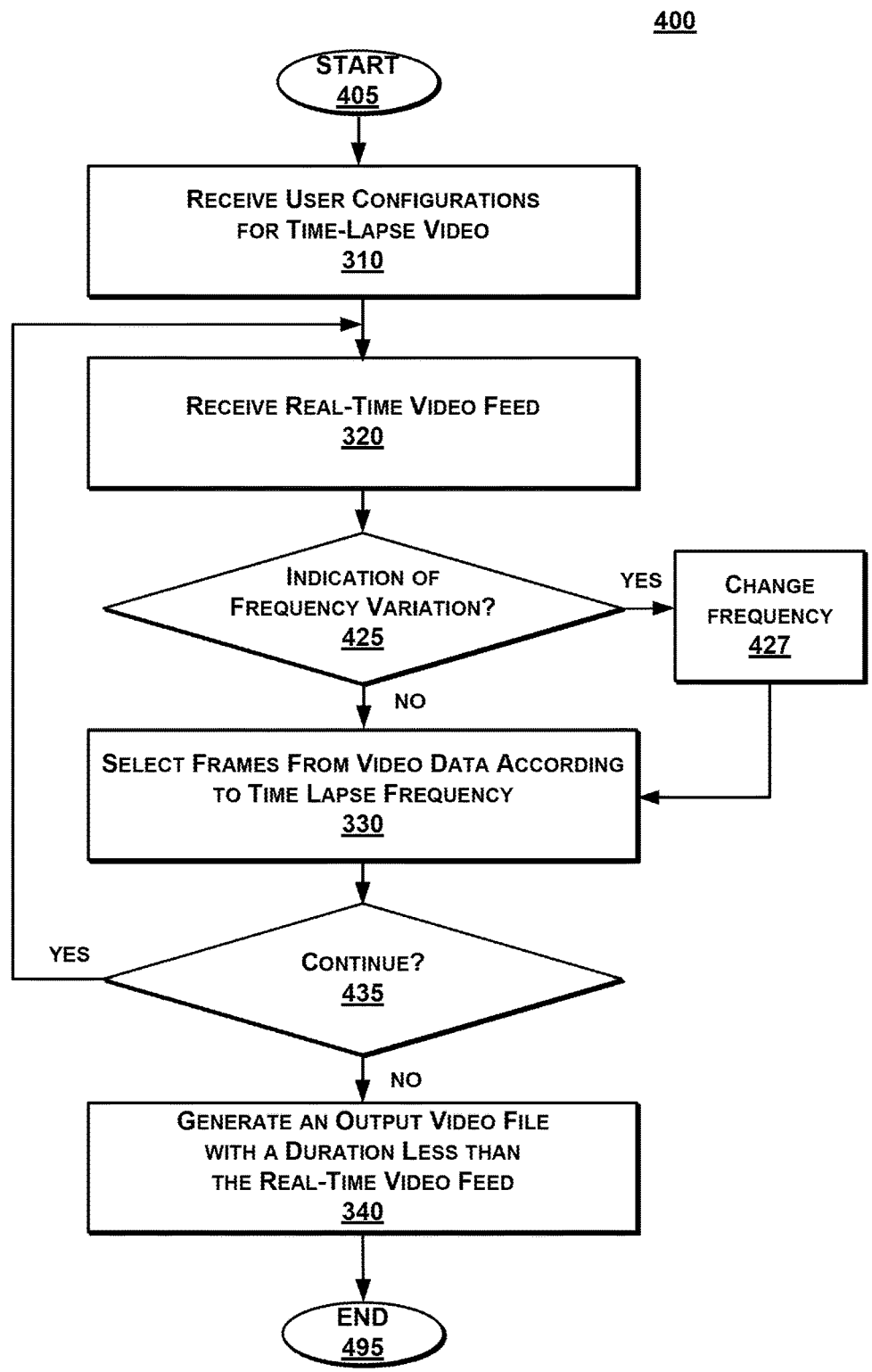
FIG. 4 is a flow diagram illustrating a method for varying the frequency of time lapse video, according to one embodiment.

Time Lapse Video Methods (FIGS. 3-4)

FIG. 3 is a high-level flow diagram illustrating a method 300 for creating time lapse video in real-time, according to one embodiment. The method 300 can be implemented, in one embodiment, using the system 100 of FIG. 1. Moreover, the method 300 can be implemented in software, hardware, or a combination of both. The method 300 can be automatically performed (once initialized) without human intervention.

At step 310, user configurations for time lapse video are received. The user configurations can be set through a user interface or a physical setting. There can be pre-configured frequencies for selection (e.g., 2×, 4×, or 100×), or an input box to type in an exact selection. There can be additional preconfigured options for the desired input or output frame rate, the length of the desired footage or the frequency of shots, or there may be an additional input box to type in an exact desired selection.

At step 320, a real-time video feed is received. The video is received either at intervals determined by the frequency, or at regular frequency over the configured duration, or based on the user configurations. Also, natural events such as power loss or memory capacity being reached can prematurely stop the real-time video feed.

At step 330, frames from video data are selected according to time lapse parameters. Frames are discarded based on the frequency setting. Alternatively, no frames may be discarded and instead the frame rate of the output video is increased manifold to preserve the granularity of the events recorded. In such a scenario, the size of the output video may not be much smaller than the input stream captured.

At step 340, an output video file with a duration less than the real-time video feed is generated. The output video file can be displayed on a video player at the reduced duration. The output video file can also be further processed, for example, in a video editing software application. It may be understood by one skilled in the art that based on the user configurations of frame rates and frequency, the length of the output video may sometimes exceed that of the real-time video feed. In such cases the invention behaves as a slow motion capture device.

FIG. 4 is a flow diagram illustrating a method for varying the frequency of time lapse video, according to one embodiment.

At step 310, user configurations for time lapse video are received. At step 320, a real-time video feed is received. These steps can be similar to the identically-numbered steps of the method 300 of FIG. 3 described above.

At step 425, if an indication of frequency variation is detected, at step 427, the frequency setting is changed. The frequency can be permanently varied, or temporarily varied by a user. For example, a sporting event that is time lapsed speeds up the event, but a user may desire to slow down certain parts over the duration. In one case, when the winner of a fight is declared, the user can press a button which slows down the time lapsing by a default such a half. As a result, if the time lapse was recording at 4×, the temporary slowdown at half speed would change the recording to 2× temporarily while the slowdown button is pushed.

On the other hand, at step 425, if an indication of frequency variation is not detected, at step 330, frames are selected from video data according to an existing time lapse frequency. The operation is normal.

At step 340, an output video file with a duration less than the real-time video feed is generated, as discussed above.

One of ordinary skill in the art will recognize that, given the disclosure herein, that many other embodiments are possible. In an embodiment, the device can be equipped with a Graphical User Interface that allows the user to manipulate the frequency, frame rate, length of footage desired etc. without interfering with the underlying hardware settings. The GUI automatically adjusts these hardware settings for the user.

In one embodiment, if the device is capable of being connected to the internet, the resulting videos thus generated can be stored in the cloud database of a service provider.

In another embodiment, the device may be equipped with a GPS that allows the user to store the location information where the video was shot.

In yet another embodiment, the device may be equipped with networking hardware that can connect the device to a local Wi-Fi hub, or the cellular network to allow access to the internet.

In still another embodiment, the device may be equipped with a GUI that allows the user to upload the videos so created to various social networks such as Facebook, Twitter etc.

In an alternative embodiment, voice and audio data may be overlaid with the time lapse video overlaid to form a complete multimedia experience. The user can also insert captions, title and other text elements and overlay them with the video.

In another embodiment, the user may be able to provide modules for embedding network content such as information based on the location of the video being shot or advertisements based on the content or the location of the video.

Figure 5:
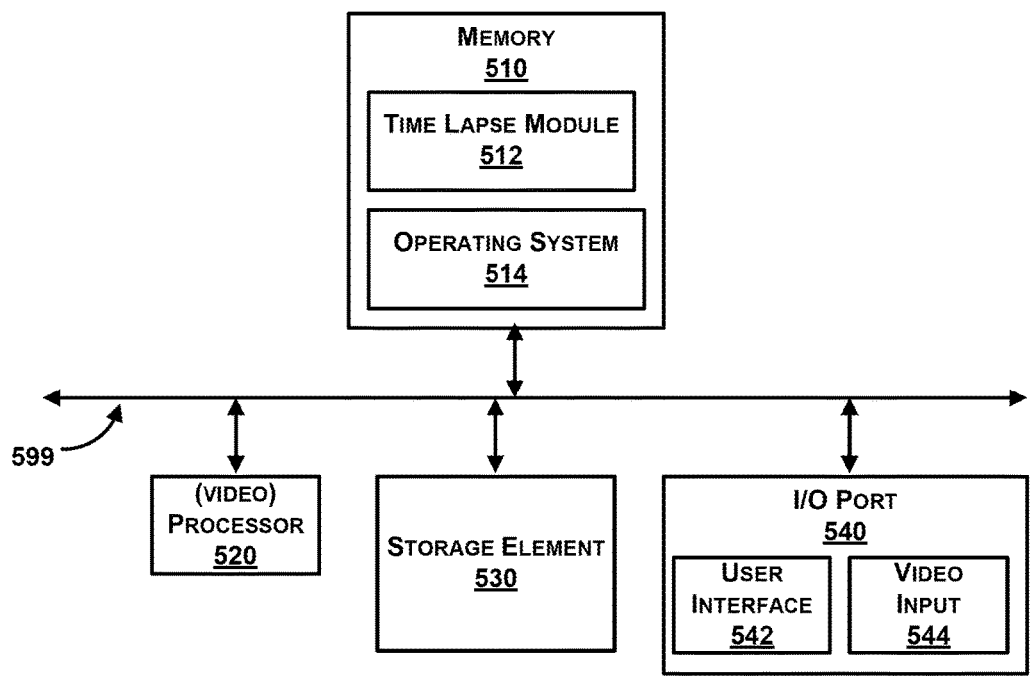
FIG. 5 is a block diagram illustrating an exemplary computing device, according to one embodiment, according to one embodiment.

Exemplary Computing Device (FIG. 5)

FIG. 5 is a block diagram illustrating an exemplary computing device 500 for use in the system 100 of FIG. 1, according to one embodiment.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises a time lapse module 512 (as described above) and an operating system 514. Other modules stored in memory can include a web browser application, a web-browser-based application, a mobile application, a streamed application, a locally-installed application, and the like.

The operating system 514 can be one of the Microsoft Windows® family of operating systems (e.g., Windows 2000, Windows XP, Windows XP x64 Edition, Windows Vista, Widows 7, Windows 8, Windows CE, Windows Mobile), Linux, HP-UX, UNIX, Sun OS, Solaris, Mac OS X, Alpha OS, AIX, IRIX32, IRIX64, iOS, Android etc. Other operating systems may be used. Microsoft Windows is a trademark of Microsoft Corporation.

The processor 520 can be a video processor, a general purpose processor, an application-specific integrated circuit (ASIC), a field programmable gate array (FPGA), a reduced instruction set controller (RISC) processor, an integrated circuit, a Digital Signal Processor (DSP) or the like. A video processor can be optimized for repeated operations. The processor 520 can be single core, multiple core, or include more than one processing elements. The processor 520 can be disposed on silicon or any other suitable material. The processor 520 can receive and execute instructions and data stored in the memory 510 or the storage drive 530. In addition the processor may also be capable of running a virtual machine for exclusively running the video editing software.

The storage drive 530 can be any non-volatile type of storage such as a magnetic disc, EEPROM, Flash, or the like. The storage drive 730 stores code and data for applications.

The I/O port 540 further comprises a user interface 642 and a video input 544. The user interface 442 can output to a display device and receive input from, for example, a keyboard. The video input 544 can be a video source or an input such as a video plug.

Many of the functionalities described herein can be implemented with computer software, computer hardware, computer firmware, or a combination.

Computer software products (e.g., non-transitory computer products storing source code) may be written in any of various suitable programming languages, such as C, C++, C#, Java, JavaScript, PHP, Python, Perl, Ruby, AJAX or HTML5 etc. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Bluetooth, LTE, Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, JAVA applets, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method for creating time lapse video in real-time, comprising:
    receiving a real-time video feed from a video input device;
    receiving one or more user configurations related to time lapse video, wherein the one or more user configurations comprise a duration of input that corresponds to a span of content covered by the real-time video feed;
    automatically generating frames according to the one or more predetermined user configurations, wherein said generating comprises:
        buffering frames of the real-time video feed; and automatically selecting buffered frames according to a frequency set by the one or more user predetermined configurations; and
    outputting a time lapse video file, wherein outputting the time-lapse video file comprises outputting the selected buffered frames,
    wherein a duration of the time lapse video file is less than a duration of the real-time video feed while span of content covered is substantially equivalent for both the time lapse video file and the real-time video feed.

2. The method of claim 1, further comprising:
    receiving an indication to insert at least one of: a caption, a title, and a text element in the time lapse video file from a user.

3. The method of claim 2, further comprising:
    overlaying the insertion on the video stream.

4. The method of claim 1, wherein the video input device comprises one or more processors.

5. The method of claim 1 wherein the video input device comprises a graphical user interface.

6. The method of claim 5, wherein the graphical user interface allows the user to manipulate the frequency.

7. The method of claim 5, wherein the graphical user interface allows the user to manipulate the duration of the time lapse video.

8. The method of claim 5, wherein the graphical user interface allows the user to manipulate a frame rate corresponding to the time lapse video file.

9. The method of claim 5, wherein the graphical user interface allows the user to upload the time lapse video file to a social network.

10. The method of claim 1, wherein the video input device comprises a GPS.

11. The method of claim 10, wherein the GPS allows a user to store location information concerning where the real-time video feed was shot.

12. The method of claim 1, wherein the video input device comprises a communications module to connect the video input device to the internet.

13. A computer-implemented method for creating time lapse video in real-time, comprising:
    receiving a real-time video feed from a video input device;
    receiving one or more user configurations related to time lapse video, wherein the one or more user configurations comprise a duration of input that corresponds to a span of content covered by the real-time video feed;
    automatically generating frames according to the one or more predetermined user configurations, wherein said generating comprises:
        buffering frames of the real-time video feed; and automatically selecting buffered frames according to a specific frequency set by the one or more user predetermined configurations; and
    outputting a time lapse video file, wherein outputting the time-lapse video file comprises outputting the selected buffered frames, and
    wherein a duration of the time lapse video file is less than a duration of the real-time video feed while span of content covered is substantially equivalent for both the time lapse video file and the real-time video feed.

* * * * *